US012292166B2

(12) United States Patent
Kitano et al.

(10) Patent No.: US 12,292,166 B2
(45) Date of Patent: May 6, 2025

(54) LIGHTING SYSTEM

(71) Applicant: Panasonic Intellectual Property Management Co., Ltd., Osaka (JP)

(72) Inventors: Hiroshi Kitano, Hyogo (JP); Takanori Aketa, Osaka (JP); Taisuke Nishimori, Osaka (JP); Kenichiro Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/252,673

(22) PCT Filed: Oct. 14, 2021

(86) PCT No.: PCT/JP2021/038141
§ 371 (c)(1),
(2) Date: May 11, 2023

(87) PCT Pub. No.: WO2022/118542
PCT Pub. Date: Jun. 9, 2022

(65) Prior Publication Data
US 2024/0011606 A1 Jan. 11, 2024

(30) Foreign Application Priority Data
Dec. 4, 2020 (JP) .................... 2020-202313

(51) Int. Cl.
*F21K 9/64* (2016.01)
*F21V 1/04* (2006.01)
(Continued)

(52) U.S. Cl.
CPC ............ *F21K 9/64* (2016.08); *F21V 1/04* (2013.01); *F21V 33/006* (2013.01); *F21V 2200/17* (2015.01); *F21Y 2115/30* (2016.08)

(58) Field of Classification Search
CPC . F21K 9/64; F21V 1/04; F21V 33/006; F21V 2200/17; F21Y 2113/10; F21Y 2115/30
See application file for complete search history.

(56) References Cited

U.S. PATENT DOCUMENTS

2011/0044070 A1   2/2011   Takahashi
2011/0305001 A1   12/2011  Medendorp, Jr.
(Continued)

FOREIGN PATENT DOCUMENTS

JP    H9-35517 A       2/1997
JP    2011-154830 A    8/2011
(Continued)

OTHER PUBLICATIONS

Machine translation of JP 2019016510 A (Year: 2019).*
(Continued)

*Primary Examiner* — Anne M Hines
*Assistant Examiner* — Jose M Diaz
(74) *Attorney, Agent, or Firm* — Rimon P.C.

(57) ABSTRACT

A lighting system includes a light source unit and a light-distributing member. The light source unit includes a laser light source. The light-distributing member has the function of reflecting incident light that has been emitted as a beam of light from the light source unit toward a target space. The light-distributing member transforms the incident light into lighting light having a different light distribution property from the incident light and distributes the lighting light over the target space.

9 Claims, 18 Drawing Sheets

(51) Int. Cl.
    *F21V 33/00*      (2006.01)
    *F21Y 113/10*      (2016.01)
    *F21Y 115/30*      (2016.01)

(56) References Cited

U.S. PATENT DOCUMENTS

2018/0017220 A1*   1/2018   Kitano ................... F21V 7/05
2020/0393106 A1*   12/2020   Bursy .................. F21S 41/16

FOREIGN PATENT DOCUMENTS

| | | |
|---|---|---|
| JP | 2012-182003 A | 9/2012 |
| JP | 2015-210872 A | 11/2015 |
| JP | 2019-016510 A | 1/2019 |
| JP | 2020-161347 A | 10/2020 |

OTHER PUBLICATIONS

International Search Report dated Nov. 16, 2021 issued in International Patent Application No. PCT/JP2021/038141, with English translation.
Extended European Search Report dated Apr. 29, 2024 issued in the corresponding European Patent Application No. 21900298.7.
Notice of Reasons for Refusal received in corresponding Japanese Patent Application No. 2022-566773, dated Oct. 22, 2024.

\* cited by examiner

LIGHTING SYSTEM

CROSS-REFERENCE OF RELATED APPLICATIONS

This application is the U.S. National Phase under 35 U.S.C. § 371 of International Patent Application No. PCT/JP2021/038141, filed on Oct. 14, 2021, which in turn claims the benefit of Japanese Patent Application No. 2020-202313, filed on Dec. 4, 2020, the entire disclosures of which Applications are incorporated by reference herein.

TECHNICAL FIELD

The present disclosure generally relates to a lighting system, and more particularly relates to a lighting system for providing lighting light for a target space.

BACKGROUND ART

Patent Literature 1 discloses a lighting system including lighting equipment (lighting fixture) for lighting up a part of an indoor space.

The lighting equipment may be installed on, for example, the ceiling of the indoor space in a building. The lighting equipment includes a housing and a light-emitting module.

In the lighting system of Patent Literature 1, the lighting fixture needs to be installed on the ceiling of the indoor space (target space) to provide lighting light for the indoor space.

CITATION LIST

Patent Literature

Patent Literature 1: JP 2020-161347 A

SUMMARY OF INVENTION

An object of the present disclosure is to provide a lighting system with the ability to provide lighting light for a target space without using any lighting fixture.

A lighting system according to an aspect of the present disclosure includes a light source unit and a light-distributing member. The light source unit includes a laser light source. The light-distributing member has a function of reflecting incident light that has been emitted as a beam of light from the light source unit toward a target space. The light-distributing member transforms the incident light into lighting light having a different light distribution property from the incident light and distributes the lighting light over the target space.

DESCRIPTION OF EMBODIMENTS

The drawings to be referred to in the following description of first to fifth embodiments and their variations are all schematic representations. Thus, the ratio of the dimensions (including thicknesses) of respective constituent elements illustrated on the drawings does not always reflect their actual dimensional ratio.

First Embodiment

A lighting system 100 according to a first embodiment will now be described with reference to FIGS. 1-3.

(1) Overview

The lighting system 100 may be used, for example, to light up a target space S1 in a facility. The facility may be, for example, an office building. Examples of other applicable facilities include single-family dwelling houses, multi-family dwelling houses, stores, art museums, hotels, factories, athletic stadiums, and airports.

Figure 1:
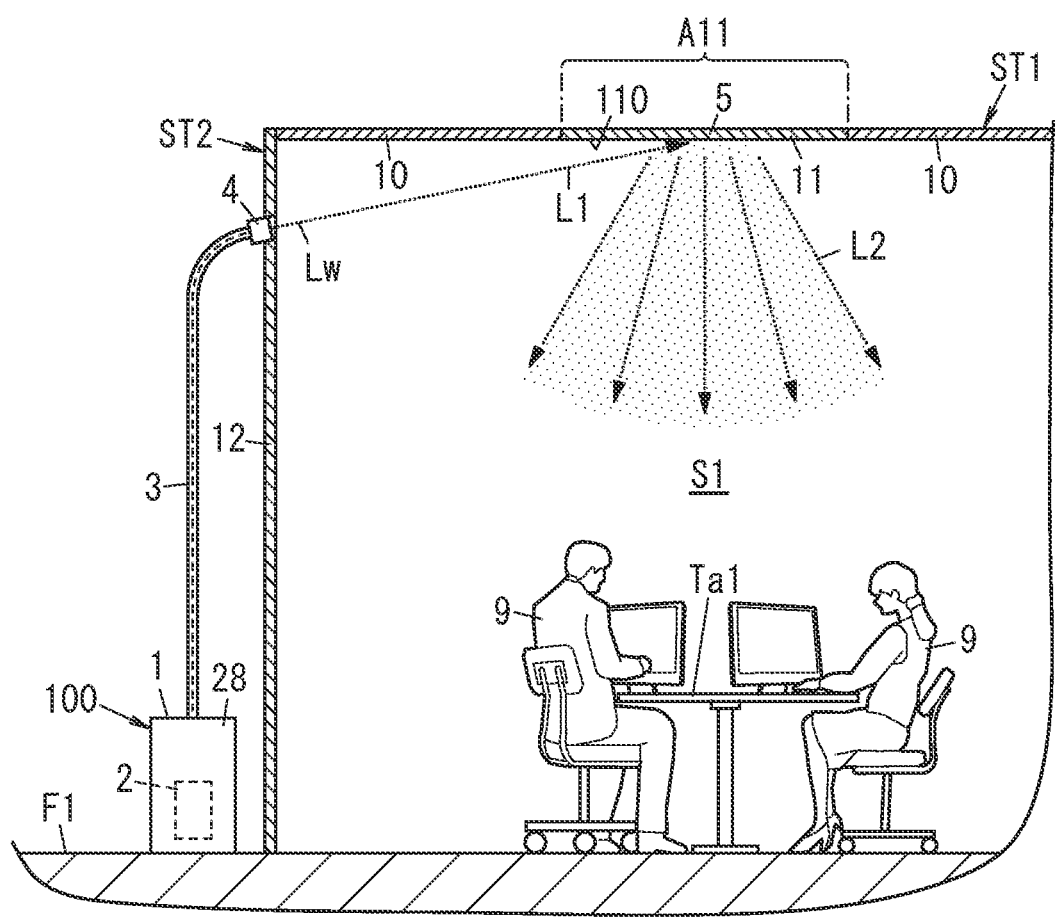
FIG. 1 illustrates a configuration for a lighting system according to a first embodiment.

As shown in FIG. 1, the lighting system 100 includes a light source unit 1 and a light-distributing member 5. The lighting system 100 makes a beam of light (e.g., a white beam of light Lw) emitted from the light source unit 1 incident as incident light L1 on the light-distributing member 5 to have the light-distributing member 5 transform the incident light L1 into lighting light L2 and deliver the lighting light L2.

The light source unit 1 includes a laser light source 2. The light-distributing member 5 has the function of reflecting the incident light L1. The light-distributing member 5 transforms the incident light L1 into lighting light L2 having a different light distribution property from the incident light L1 and distributes the lighting light L2 over the target space S1. In the lighting system 100, the light-distributing member 5 is a building component 11 (hereinafter referred to as a "first building component 11"). The first building component 11 forms part of a structure ST1 (hereinafter referred to as a "first structure ST1") facing the target space S1. As used herein, the expression "facing the target space S1" means being in contact with the target space S1. The first structure ST1 including the first building component 11 is in contact with the target space S1 to define a boundary between the target space S1 and the space above the ceiling. The first structure ST1 is the ceiling of the facility. The target space S1 is the space under the ceiling.

In the lighting system 100, the light source unit 1 includes an optical fiber 3 that receives the light (e.g., blue light Lb) emitted from the laser light source 2.

(2) Configuration for Lighting System

The lighting system 100 includes the light source unit 1 and the light-distributing member 5 as described above.

(2.1) Light Source Unit

The light source unit 1 includes a laser light source 2. The laser light source 2 may be, for example, a semiconductor laser diode that emits blue light Lb (as a laser beam) (refer to FIG. 2). Thus, the blue light Lb is emitted from the laser light source 2. The semiconductor laser diode may be, for example, a GaN-based semiconductor laser diode. The laser beam may have a peak wavelength equal to or higher than 440 nm and equal to or shorter than 480 nm, for example. The light source unit 1 may include, for example, two laser light sources 2 as shown in FIG. 2.

In addition, the light source unit 1 further includes the optical fiber 3 and a projection member 4.

In the light source unit 1, the blue light Lb emitted from the two laser light sources 2 is incident on the single optical fiber 3. The blue light Lb incident on the optical fiber 3 propagates through the optical fiber 3, emerges from the optical fiber 3, and then is incident on the projection member 4. The projection member 4 transforms the blue light Lb that has come from the laser light source 2 into white light Lb and projects the white light Lw toward the target space S1. The white light Lw projected from the projection member 4 is incident as incident light L1 onto the light-distributing member 5.

Figure 2:
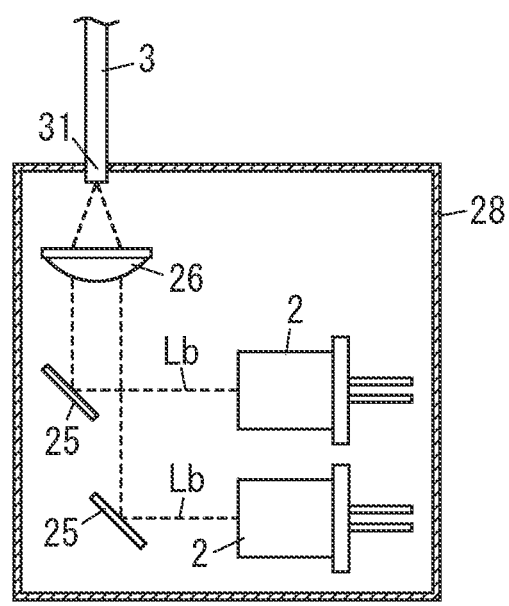
FIG. 2 illustrates a configuration for a light source unit included in the lighting system.

As shown in FIG. 2, the light source unit 1 further includes: two mirrors 25 provided one to one for the two laser light sources 2; a condenser lens 26; and a housing 28. The housing 28 houses the two laser light sources 2, the two mirrors 25, and the condenser lens 26. Each of the two mirrors 25 reflects the blue light Lb that has been emitted from an associated one of the two laser light sources 2 toward the condenser lens 26. The condenser lens 26 is disposed between the two mirrors 25 and the optical fiber 3 to make the blue light Lb reflected by each of the two mirrors 25 incident on the single optical fiber 3. That is to say, the two laser light sources 2 and the optical fiber 3 are optically coupled to each other via the two mirrors 25 and the condenser lens 26.

As shown in FIG. 1, the housing 28 is disposed distant from the first building component 11. More specifically, the light source unit 1 is disposed outside of a projection area A11 of the first building component 11 as viewed from the target space S1. For example, the housing 28 may be disposed behind a second building component 12 and on a floor surface F1. The second building component 12 forms at least part of a second structure ST2. The second structure ST2 defines the target space S1 along with the first structure ST1. The projection area A11 of the first building component 11 as viewed from the target space S1 is a projection area (perpendicular projection area) of the first building component 11 as viewed from the target space S1 along the thickness of the first building component 11 in the shape of a panel. In short words, the projection area A11 is a projection area as viewed along the thickness of the first building component 11.

The second building component 12 forms at least part of the second structure ST2 facing the target space S1. As used herein, the phrase "facing the target space S1" means being in contact with the target space S1. The second structure ST2 including the second building component 12 is in contact with the target space S1 to define the target space S1. The second structure ST2 is a wall of the facility (refer to FIG. 1). The second building component 12 has the shape of a panel. The second building component 12 may, but does not have to, have a rectangular shape when viewed along the thickness of the second building component 12. Alternatively, the second building component 12 may also have a square shape. As used herein, the expression "when viewed along the thickness of the second building component 12" means viewing the second building component 12 from the target space S1 along the thickness of the second building component 12, not viewing the second building component 12 from the other side (i.e., opposite from the target space S1) along the thickness of the second building component 12.

The optical fiber 3 includes a core, a cladding, and a coating. The cladding covers the outer peripheral surface of the core. The coating covers the outer peripheral surface of the cladding. The core has a first end face and a second end face opposite from the first end face. A cross section, taken along a plane intersecting at right angles with the optical axis, of the core has a circular shape. The cladding is disposed coaxially with the core. The core may be made of a light-transmitting material. The light-transmitting material may be, for example, a fluoride, an oxide, or a nitride. The fluoride may be glass fluoride, for example. The oxide may be a silicon oxide or quartz, for example. The refractive index of the cladding is less than the refractive index of the core. The coating covers the outer peripheral surface of the cladding. The material of the coating may be a resin, for example.

In the optical fiber 3, the core may have a diameter falling within the range from 20 μm to 1000 μm, for example. The optical fiber 3 may have a length falling within the range from 1 m to 100 m, for example. If the core of the optical fiber 3 had a diameter less than 20 μm, then it would be difficult to couple the light emitted from the laser light source 2 to the optical fiber 3 with high efficiency. On the other hand, if the core of the optical fiber 3 had a diameter greater than 1000 μm, then it would be difficult to bend the optical fiber 3 at a small bend radius, thus imposing significant restriction on handling.

The optical fiber 3 has a first end 31 (refer to FIG. 2) of the longitudinal axis thereof and a second end 32 (refer to FIG. 3) located opposite from the first end 31. The first end 31 of the optical fiber 3 includes an incident end face (i.e., a first end face of the core) on which the light coming from the laser light sources 2 is incident. The second end 32 of the optical fiber 3 includes an emerging end face (i.e., a second end face of the core) through which the light incident through the incident end face and propagating through the optical fiber 3 emerges.

The projection member 4 may be included in the second building component 12, for example. However, this is only an example and should not be construed as limiting. The projection member 4 does not have to be included in the second building component 12.

The projection member 4 is disposed at a point on the second building component 12 where the height as measured from the floor surface F1 is equal to or greater than a predetermined height (of 2 meters 30 centimeters, for example). The predetermined height is determined such that the projection member 4 is located higher than the head top of a person 9 as measured from the floor surface F1 (i.e., the top of the head of the person 9 who is standing on the floor surface F1). In addition, the projection member 4 is arranged to let the incident light L1 travel upward with respect to the horizontal direction (i.e., diagonally upward), not downward with respect to the horizontal direction. This makes the projection member 4 less conspicuous in the lighting system 100, improves the aesthetic appearance of the second building component 12 provided with the projection member 4, and prevents the person 9 from peeking into the projection member 4.

Figure 3:
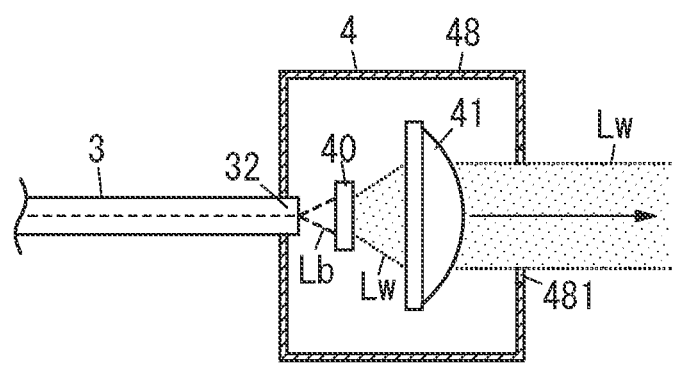
FIG. 3 illustrates a configuration for a projection member of the light source unit included in the lighting system.

As shown in FIG. 3, the projection member 4 includes a wavelength converter 40, a collimator lens 41, and a housing 48. The wavelength converter 40 has the function of transforming the blue light Lb into white light Lw including light with a different wavelength from the blue light Lb.

The blue light Lb emerging from the optical fiber 3 is incident on the wavelength converter 40 of the projection member 4. The wavelength converter 40 includes, for example, a light-transmitting material portion and phosphor particles. In this case, the wavelength converter 40 is made of a mixture of the light-transmitting material portion and the phosphor particles. In the wavelength converter 40, a great many phosphor particles are contained in the light-transmitting material portion. A material for the light-transmitting material portion (i.e., the light-transmitting material) is preferably a material, of which the transmittance to visible light is high. The light-transmitting material may be, for example, a silicone-based resin. This improves the heat resistance and weather resistance of the wavelength converter 40 of the projection member 4. Examples of the "silicone-based resin" include silicone resin and modified silicone resin. The wavelength converter 40 includes phosphor particles as a wavelength-converting element. The wavelength-converting element converts the wavelength of a part of the blue light Lb to radiate light having a different wavelength from the blue light Lb. As the phosphor particles, yellow phosphor particles that radiate yellow light may be adopted, for example. The light (fluorescence) radiated from the yellow phosphor particles preferably has an emission spectrum having a primary emission peak wavelength in a wavelength range from 530 nm to 580 nm, for example. The yellow phosphor particles may be, but does not have to be, $Y_3Al_5O_{12}$ activated with Ce.

Also, the wavelength converter 40 does not have to include, as the wavelength-converting element, only yellow phosphor particles but may include, as the wavelength-converting element, yellow phosphor particles, yellow-green phosphor particles, green phosphor particles, and red phosphor particles. That is to say, the wavelength converter 40 may include multiple types of phosphor particles. The white light Lw emerging from the wavelength converter 40 is a mixture of blue light and yellow light. The white light Lw emerging from the wavelength converter 40 is incoherent light.

The collimator lens 41 is located opposite from the second end 32 of the optical fiber 3 with respect to the wavelength converter 40. The collimator lens 41 collimates the white light Lw emerging from the wavelength converter 40.

The housing 48 houses the wavelength converter 40 and the collimator lens 41. In the housing 48, at least its part 481 which transmits the white light Lw that has been collimated by the collimator lens 41 is made of a light-transmitting material. The light-transmitting material may be a silicone resin, for example. However, this is only an example and should not be construed as limiting. The light-transmitting material does not have to be a silicone resin but may also be, for example, a fluororesin, a low-melting glass, or a sol-gel glass. The light-transmitting material preferably has high transmittance to visible light. In the housing 48, the part 481 that transmits the white light Lw that has been collimated by the collimator lens 41 may be an aperture.

When the second building component 12 is viewed from a person 9 present in the target space S1, the light source unit 1 is shaded by the second building component 12. In other words, the light source unit 1 is shaded by the second building component 12 (refer to FIG. 1).

(2.2) Light-Distributing Member

As shown in FIG. 1, the light-distributing member 5 has the function of reflecting the incident light L1 that has been emitted as a beam of light from the light source unit 1. The light-distributing member 5 transforms the incident light L1 into lighting light L2 having a different light distribution property from the incident light L1 and distributes the lighting light L2 over the target space S1. In this case, the lighting light L2 has a light distribution property with a lower degree of directivity than the incident light L1. In other words, the lighting light L2 has a wider beam divergence angle than the incident light L1. Stated otherwise, the lighting light L2 has a broader light distribution than the incident light L1. The light-distributing member 5 diffuse-reflects the incident light L1, thereby transforming the incident light L1 into the lighting light L2 to be distributed over the target space S1. The light-distributing member 5 preferably has a property with a higher diffuse reflectance. This allows the light-distributing member 5 to decrease its light absorbance and increase its diffusivity. The light-distributing member 5 may be colored in white, which is one of preferred colors for the light-distributing member 5. The light-distributing member 5 is preferably non-glossy rather than being glossy. In other words, the light-distributing member 5 preferably has a high diffuse reflectance but has a low specular reflectance. Also, if the first building component 11 is used as the light-distributing member 5, a white panel is preferably used as the first building component 11 if the circumstances permit.

The light-distributing member 5 has a first function, a second function, and a third function. The first function is the function of reflecting the incident light L1 toward the target space S1. The second function is the function of transforming the incident light L1 into the lighting light L2. The third function is the function of delivering the lighting light L2 toward the target space S1. The lighting light L2 is light having a lower degree of coherence than the incident light L1. That is to say, the lighting light L2 is incoherent light.

The light-distributing member 5 is the first building component 11 that forms part of the first structure ST1 facing the target space S1. The first building component 11 is a ceiling member. The light source unit 1 is disposed distant from the first building component 11. The incident light L1 passes through the target space S1 to be incident on a lower surface 110, facing the target space S1, of the first building component 11. In the facility, a table Ta1 to be used by, for example, the persons 9 as users of the facility is installed on the floor surface F1 to be located under the light-distributing member 5.

In the facility, a ceiling facing the target space S1 may be formed, for example, by a plurality of first building components 11 and a plurality of ceiling members 10.

The first building component 11 and at least one of the plurality of ceiling members 10 other than the first building component 11 itself may be arranged side by side. However, this is only an example and should not be construed as limiting. Alternatively, the first building component 11 and another first building component 11 other than itself may also be arranged side by side. The first building component 11 has the shape of a panel. The first building component 11, as well as the ceiling member 10, may have a square shape when viewed along the thickness thereof. However, this is only an example and should not be construed as limiting. The first building component 11 may also have a rectangular shape when viewed along the thickness thereof. As used herein, the expression "when viewed along the thickness of the first building component 11" means viewing the first building component 11 from the target space S1 along the thickness of the first building component 11, not viewing the first building component 11 from the other side, opposite from the target space S1, along the thickness of the first building component 11. The first building component 11 may have the same size as the ceiling member 10, for example, but may also have a different size from the ceiling member 10. The first building component 11, as well as the ceiling member 10, is supported by a supporting member. The supporting member may be formed of, for example, a plurality of galvanized steel plates.

Each of the first building component 11 and the ceiling member 10 may be, for example, a decorative plywood board or a decorative board. Examples of the decorative plywood board include a natural wood decorative plywood board and a specially processed and overlaid decorative board. Examples of the specially processed and overlaid decorative board include synthetic resin decorative boards, printed plywood boards, vinyl chloride decorative boards, and paper or cloth overlaid plywood boards. Examples of the decorative board include medium density fiberboards (MDFs), Dailite, rock wool boards, calcium silicate boards, and insulation boards. The first building component 11 may have, for example, opacity, non-flammability, sound absorbency, and thermal insulation properties. Each of the first building component 11 and the ceiling member 10 preferably has at least opacity and non-flammability.

(2.3) Other Constituent Elements of Lighting System

The lighting system 100 may further include a power supply unit. The power supply unit supplies power to the two laser light sources 2 and other members. The power supply unit includes a driver circuit for driving the two laser light sources 2 (refer to FIG. 2) and a control circuit for controlling the driver circuit. In the lighting system 100, making the control circuit control the driver circuit allows the optical output of the two laser light sources 2 to be adjusted, thus making the illuminance (brightness) of the lighting light L2 adjustable as well. The power supply unit may be housed in the housing 28 of the light source unit 1, for example. However, the power supply unit does not have to be housed in the housing 28. A supply voltage is supplied to the power supply unit from an external power supply via a cable.

(3) Operation of Lighting System

The lighting system 100 causes the two laser light sources 2 to emit blue light Lb. Thus, in the lighting system 100, the blue light Lb emitted from the laser light sources 2 enters the optical fiber 3, propagates through the optical fiber 3, and then is incident on the projection member 4. The projection member 4 makes the wavelength converter 40 transform the incident blue light Lb into white light Lw and makes the collimator lens 41 collimate the white light Lw to project the collimated white light Lw toward the target space S1. The white light Lw that has been projected from the projection member 4 passes through the target space S1 to be incident as the incident light L1 onto the light-distributing member 5. The light-distributing member 5 reflects the incident light L1, thus delivering lighting light L2, having a different light distribution property from the incident light L1, toward the target space S1. The lighting light L2 is incoherent light with a low degree of directivity.

(4) Recapitulation

The lighting system 100 according to the first embodiment may provide lighting light L2 from the ceiling toward the target space S1 without installing any lighting fixture on the ceiling facing the target space S1. Thus, the lighting system 100 according to the first embodiment allows the lighting light L2 providing area to be set in the target space S1 with a high degree of freedom. In addition, the lighting system 100 may also be installed more easily. Furthermore, the lighting system 100 according to the first embodiment uses, as the incident light L1, light having a high degree of directivity and a high degree of coherence (i.e., a beam of light suitable for propagation through a space over a long distance). Furthermore, in the lighting system 100, the lighting light L2 to be transformed and distributed by the light-distributing member 5 has a lower degree of directivity and a lower degree of coherence than the incident light L1 and suitable for lighting. Furthermore, the lighting system 100 uses the laser light sources 2 as the light source. Therefore, the incident light L1 may have a higher degree of directivity, thus allowing the light source to be disposed more distant from the ceiling.

In addition, the lighting system 100 according to the first embodiment allows the light source unit 1, including the laser light sources 2 that need to be supplied with power, to be disposed distant from the first building component 11, thus making the light source unit 1 maintainable much more easily.

The lighting system 100 allows the ceiling member 10 to be used as the first building component 11 serving as the light-distributing member 5 by changing the projection direction of the white light Lw emerging from the projection member 4 of the light source unit 1. This lighting system 100 allows, by providing the light-distributing member 5 discretely from the projection member 4, the designer to design lighting as if a lighting fixture were present at a place where no lighting fixture is actually present (i.e., on the ceiling). This allows the ceiling, facing the target space S1 where the lighting light L2 of the lighting system 100 is used, to have simple and significantly improved aesthetic appearance and makes the ceiling much more easily installable without any need for electrification work.

Variation of First Embodiment

Figure 4:
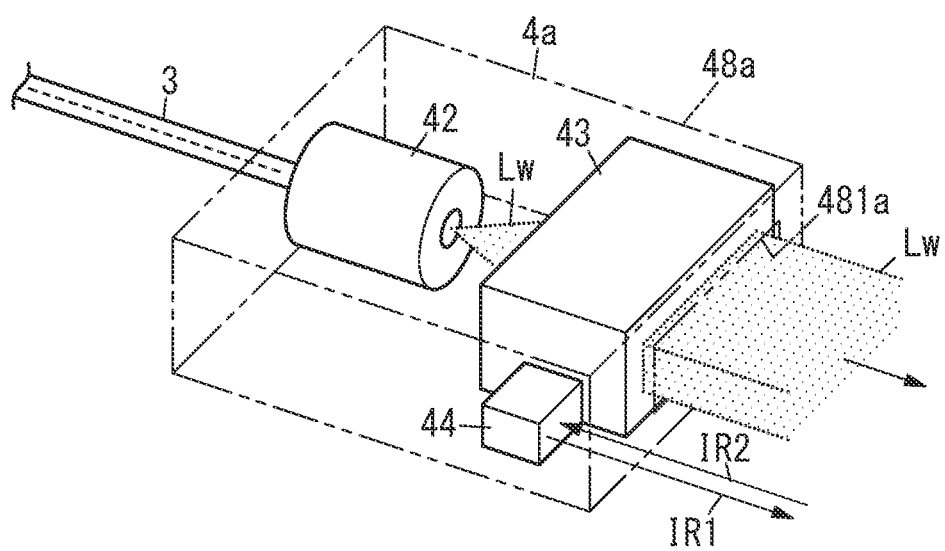
FIG. 4 illustrates a configuration for a projection member of a light source unit included in a lighting system according to a variation of the first embodiment.

A lighting system 100 according to a variation of the first embodiment includes a projection member 4a (refer to FIG. 4) instead of the projection member 4 included in the light source unit 1 of the lighting system 100 (refer to FIG. 1) according to the first embodiment. The lighting system 100 according to this variation of the first embodiment has the same basic configuration as the lighting system 100 according to the first embodiment, and description and illustration thereof will be omitted herein.

The projection member 4a includes a wavelength converting unit 42 for transforming the blue light Lb (refer to FIG. 3) coming from the optical fiber 3 into white light Lw and an optical system 43 for transforming the light distribution property of the white light Lw emerging from the wavelength converting unit 42 into a linear light distribution property and letting the white light Lw emerge with such a light distribution property. The wavelength converting unit 42 is implemented as a phosphor fiber including a phosphor in its core, for example. The optical system 43 may include, for example, a lens, a mirror, or any other optical member. The projection member 4a further includes a housing 48a that houses the wavelength converting unit 42 and the optical system 43. In the housing 48a, at least a part 481a thereof, through which the white light Lw emerging from the optical system 43 is transmitted, is made of a light-transmitting material. In the housing 48a, at least that part 481a, through which the white light Lw emerging from the optical system 43 is transmitted, may be an aperture.

The projection member 4a further includes a sensing unit 44. The sensing unit 44 is a human detection sensor that emits an infrared beam IR1, which is substantially parallel to the white light Lw emerging as a beam of light from the projection member 4a, and detects, by determining whether the sensing unit 44 has received any reflected beam IR2 of the infrared beam IR1, the presence or absence of any human being in the direction aligned with the projection direction of the white light Lw.

The lighting system 100 according to this variation of the first embodiment includes the projection member 4a instead of the projection member 4. As soon as the sensing unit 44 detects the presence of any human being, the lighting system 100 immediately instructs the laser light sources 2 (refer to FIG. 2) to stop operating. More specifically, the control circuit instructs, depending on the result of detection by the sensing unit 44, the driver circuit for driving the two laser light sources 2 to stop operating, thereby causing the two laser light sources 2 to stop emitting the laser beam (blue light Lb).

Second Embodiment

A lighting system 100b according to a second embodiment will be described with reference to FIGS. 5 and 6. In the following description, any constituent element of the lighting system 100b according to this second embodiment, having the same function as a counterpart of the lighting system 100 according to the first embodiment described above, will be designated by the same reference numeral as that counterpart's, and description thereof will be omitted herein.

The lighting system 100b according to the second embodiment includes a light source unit 1b and a light-distributing member 5b instead of the light source unit 1 and light-distributing member 5 of the lighting system 100 according to the first embodiment described above, which is a difference from the lighting system 100 according to the first embodiment. The light source unit 1b includes a projection member 4b instead of the projection member 4 of the light source unit 1, which is a difference from the light source unit 1.

The projection member 4b includes, instead of the combination of the wavelength converter 40 and collimator lens 41 of the projection member 4 (refer to FIG. 3), a collimator lens 41b for collimating the blue light Lb emerging from the optical fiber 3. In addition, the projection member 4b further includes a housing 48b that houses the collimator lens 41b. In the housing 48b, at least a part thereof, through which the blue light Lb that has been collimated by the collimator lens 41b is transmitted, is made of a light-transmitting material. The projection member 4b projects the blue light Lb, emerging from the laser light sources 2 (refer to FIG. 5), without letting the blue light Lb pass through the wavelength converter 40 (refer to FIG. 3). In other words, the lighting system 100b according to the second embodiment uses, as the incident light L1, the blue light Lb that is the laser beam (coherent light) emerging from the laser light sources 2. Coherent light has so high a degree of directivity as to be suitably transmitted over a long distance through the space. Thus, the lighting system 100b allows the blue light Lb to be used as the incident light L1 by efficiently transmitting the blue light Lb from the light source unit 1b to the light-distributing member 5b. On the other hand, to light up the lighting area in the target space S1 with the lighting light L2 evenly and uniformly, the lighting light L2 is incoherent light with a low degree of coherence. In this lighting system 100b, the light-distributing member 5b has the function of transforming the coherent light (incident light L1) suitable for transmission into incoherent light (lighting light L2) suitable for lighting (i.e., has a coherence reducing function), thus enabling delivering lighting light L2 of quality.

In the housing 48b, that part 481b, through which the blue light Lb that has been collimated by the collimator lens 41b is transmitted, may be an aperture.

Figure 5:
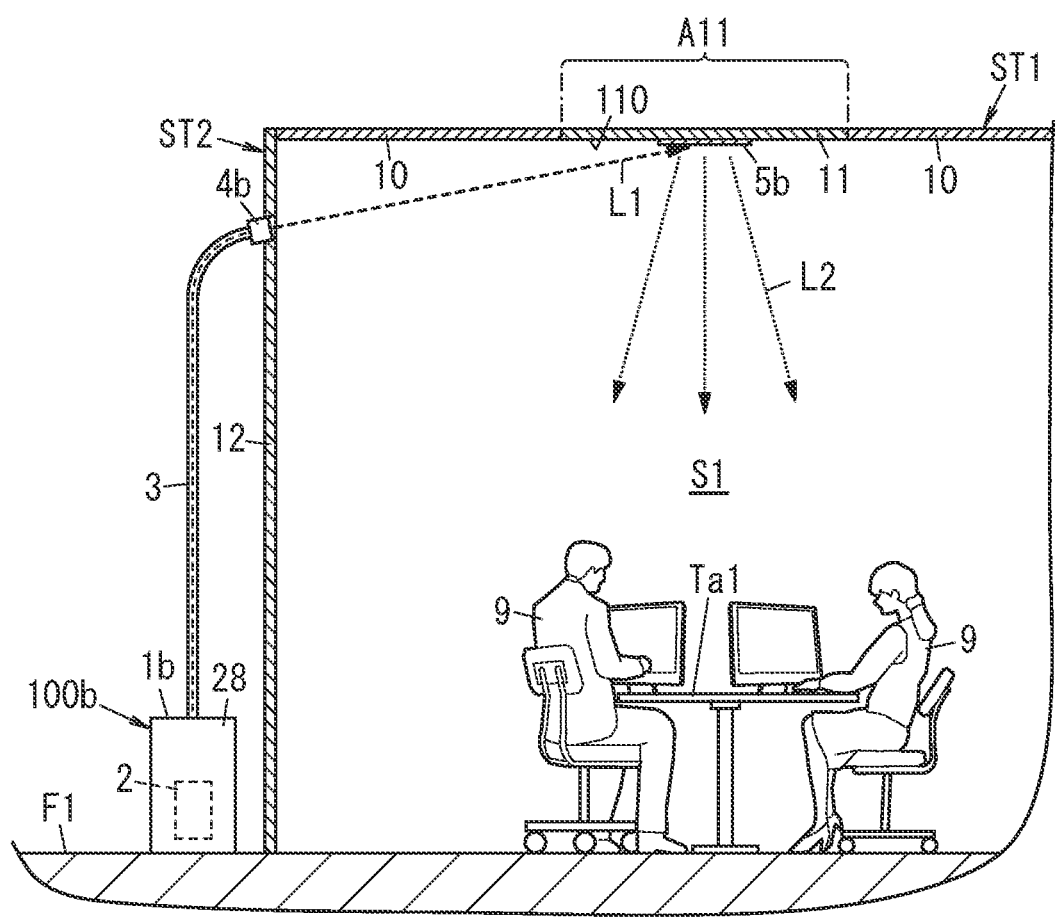
FIG. 5 illustrates a configuration for a lighting system according to a second embodiment.
Figure 6:
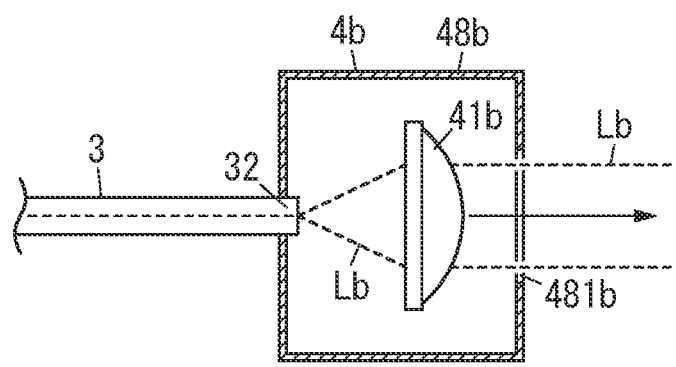
FIG. 6 illustrates a configuration for a projection member of a light source unit included in the lighting system.

As shown in FIG. 5, the light-distributing member 5b has the shape of a sheet placed on the lower surface 110 of the first building component 11. The light-distributing member 5b may have a circular shape when viewed along the thickness of the first building component 11. However, this is only an example and should not be construed as limiting. Alternatively, the light-distributing member 5b may also have an elliptical or quadrangular shape when viewed along the thickness of the first building component 11. When viewed along the thickness of the first building component 11, the light-distributing member 5b is located inside, and distant from, the outer edges of the first building component 11. When viewed along the thickness of the first building component 11, the light-distributing member 5b is placed around the center of the first building component 11. The light-distributing member 5b is secured to the first building component 11 with, for example, a pressure sensitive adhesive, an adhesive, or a double-sided adhesive tape. The light-distributing member 5b may be attached removably to the first building component 11.

The light-distributing member 5b may be, for example, a phosphor film containing yellow phosphor particles. However, this is only an example and should not be construed as limiting. Alternatively, the light-distributing member 5 may also be a film member including a film and a phosphor layer formed on the film.

The light-distributing member 5b transforms the incident light L1 into the lighting light L2 and delivers the lighting light L2 toward the target space S1. The lighting light L2 is white light.

The lighting system 100b according to the second embodiment includes the light source unit 1b and the light-distributing member 5b, and therefore, may provide, as well as the lighting system 100 according to the first embodiment, lighting light L2 for the target space S1 without installing any lighting fixture on the ceiling facing the target space S1. In addition, the lighting system 100*b* according to the second embodiment uses, as the incident light L1, light having a high degree of directivity and a high degree of coherence (i.e., a beam of light suitable for propagation through a space over a long distance). Furthermore, in the lighting system 100*b*, the lighting light L2 to be transformed and distributed by the light-distributing member 5*b* has a lower degree of directivity and a lower degree of coherence than the incident light L1 and suitable for lighting. Furthermore, the lighting system 100*b* uses the laser light sources 2 as the light source. Therefore, the incident light L1 may have a higher degree of directivity, thus allowing the light source to be disposed more distant from the ceiling.

In addition, the lighting system 100*b* may also change the light distribution property of the lighting light L2 by changing the shape of the light-distributing member 5*b*.

Furthermore, the lighting system 100*b* may also change the color temperature, light distribution property, or any other parameter of the lighting light L2 by changing at least one of the type or concentration of the phosphor particles included in the light-distributing member 5*b*.

Variation of Second Embodiment

A lighting system 100*b* according to a variation of the second embodiment includes a projection member 4*c* (refer to FIG. 7) instead of the projection member 4*b* included in the light source unit 1*b*. The lighting system 100*b* according to this variation of the second embodiment has the same basic configuration as the lighting system 100*b* (refer to FIG. 5) according to the second embodiment, and description and illustration thereof will be omitted herein.

Figure 8:
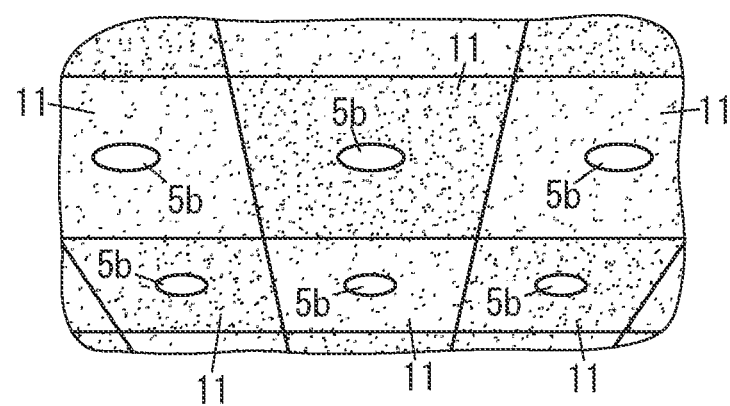
FIG. 8 is a perspective view of a plurality of light-distributing members of the lighting system.

The lighting system 100*b* according to this variation of the second embodiment includes a plurality of (e.g., six in the example illustrated in FIG. 8) light-distributing members 5*b* provided one to one for a plurality of (e.g., six in the example illustrated in FIG. 8) first building components 11 as shown in FIG. 8.

Figure 7:
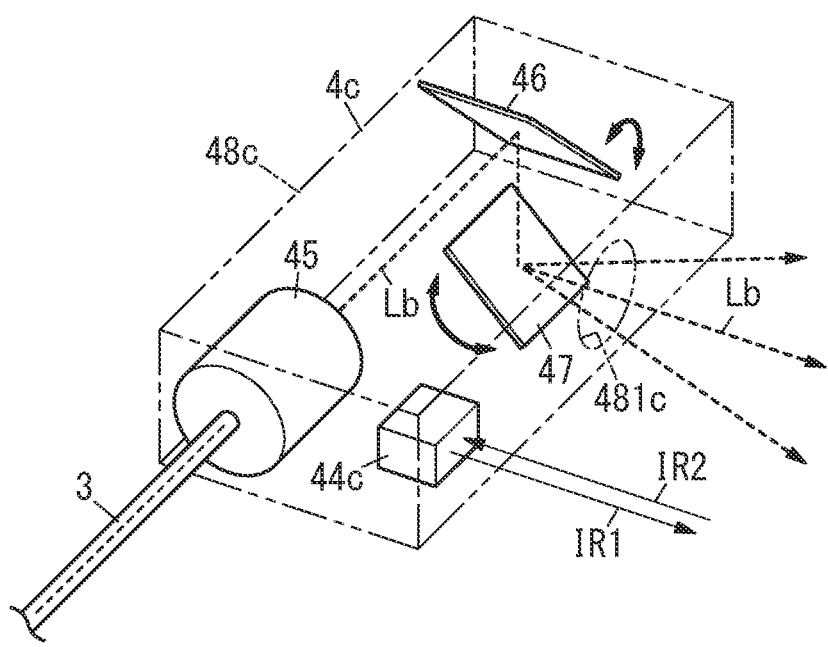
FIG. 7 illustrates a configuration for a projection member of a light source unit included in a lighting system according to a variation of the second embodiment.

As shown in FIG. 7, the projection member 4*c* includes: a collimating unit 45 for collimating the blue light Lb emerging from the optical fiber 3; and two scanning mirrors 46, 47 that allows the projection direction of the blue light Lb emerging from the collimating unit 45 to be scanned. The projection member 4*c* further includes a housing 48*c* that houses the collimating unit 45 and the two scanning mirrors 46, 47. In the housing 48*c*, at least a part 481*c* thereof, through which the blue light Lb is projected toward the target space S1 (refer to FIG. 5), is made of a light-transmitting material. That part 481*c* of the housing 48*c* may be an opening. The scanning mirrors 46, 47 are controlled by a control circuit, for example. The control circuit controls the scanning mirrors 46, 47 such that the blue light Lb projected from the projection member 4*c* is directed toward the light-distributing member 5*b*. Each of the two scanning mirrors 46, 47 may be a micro electro-mechanical systems (MEMS) mirror but may also be a polygon mirror, for example.

The projection member 4*c* further includes a sensing unit 44*c*. The sensing unit 44*c* is a human detection sensor that emits an infrared beam IR1, which is substantially parallel to the blue light Lb emerging as a beam of light from the projection member 4*c*, and detects, by determining whether the sensing unit 44*c* has received any reflected beam IR2 of the infrared beam IR1, the presence or absence of any human being in the direction aligned with the projection direction of the blue light Lb.

The lighting system 100*b* according to this variation of the second embodiment includes the projection member 4*c* instead of the projection member 4*b*. As soon as the sensing unit 44*c* detects the presence of any human being, the lighting system 100*b* immediately instructs the laser light sources 2 (refer to FIG. 5) to stop operating. More specifically, the control circuit instructs, depending on the result of detection by the sensing unit 44*c*, the driver circuit for driving the two laser light sources 2 to stop operating, thereby causing the two laser light sources 2 to stop emitting the laser beam.

The lighting system 100*b* according to this variation of the second embodiment includes the plurality of light-distributing members 5*b* and may scan the projection direction of the blue light Lb emerging from the projection member 4*c*, and therefore, may change the light-distributing members 5*b* on which the blue light Lb emerging from the projection member 4*c* is incident as the incident light L1.

The plurality of light-distributing members 5*b* do not have to be provided one to one for the plurality of first building components 11. Alternatively, two or more light-distributing members 5*b* may be arranged to be spaced from each other for a single first building component 11, for example.

Third Embodiment

A lighting system 100*d* according to a third embodiment will be described with reference to FIGS. 9-13. In the following description, any constituent element of the lighting system 100*d* according to this third embodiment, having the same function as a counterpart of the lighting system 100 according to the first embodiment described above, will be designated by the same reference numeral as that counterpart's, and description thereof will be omitted herein.

The lighting system 100*d* according to the third embodiment includes a light source unit 1*d* instead of the light source unit 1 of the lighting system 100 according to the first embodiment, which is a difference from the lighting system 100 according to the first embodiment.

Figure 12A:
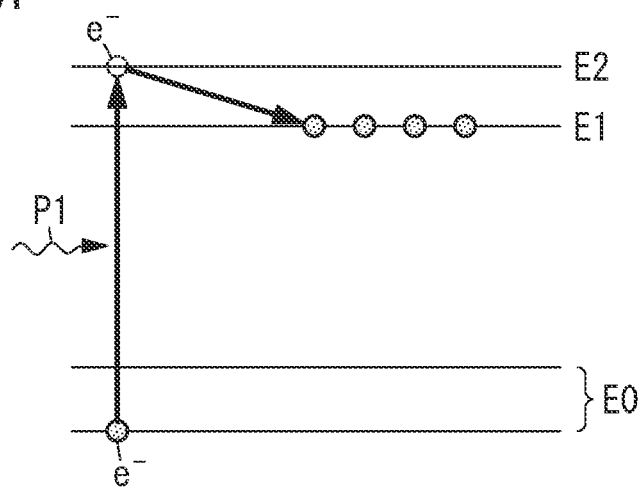
FIGS. 12A-12C illustrate how the lighting system operates.
Figure 12B:
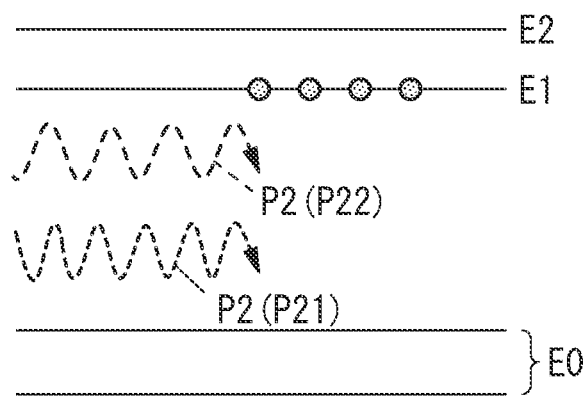
Figure 12C:
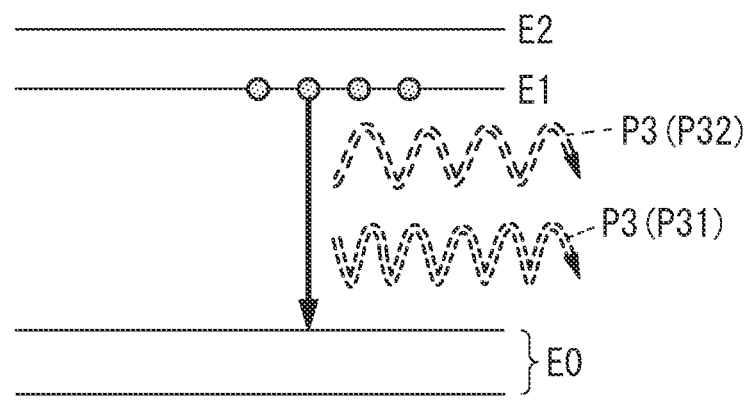

The light source unit 1*d* makes excitation light P1 (refer to FIGS. 10 and 12A) and seed light P2 (refer to FIGS. 10 and 12B) incident on an optical fiber 3*d* to which wavelength-converting elements (one or more elements) are added. The excitation light P1 excites the wavelength-converting element. The seed light P2 causes the wavelength-converting element that has been excited by the excitation light P1 to produce a stimulated emission of light P3 (refer to FIG. 12C). From the optical fiber 3*d*, light including the excitation light P1 and the stimulated emission of light P3 emerges as white light Lw (refer to FIG. 13). FIGS. 12A, 12B, and 12C illustrate the principle of operation of the light source unit 1*d*. In FIGS. 12A, 12B, and 12C, the ordinate represents the energy of electrons. The upward arrow shown in FIG. 12A indicates absorption of the excitation light P1. The downward arrow shown in FIG. 12C indicates transition about a spontaneous emission of light or a stimulated emission of light P3. In the light source unit 1*d*, an electron $e^-$ in a ground state E0 (including a plurality of energy levels) of the wavelength-converting element is excited to an excitation level E2 by the excitation light P1 that has been incident on the optical fiber 3*d*. Then, the electron $e^-$ at the excitation level E2 makes a transition to a metastable level E1, which is an energy level lower than the excitation level E2. Thereafter, the stimulated emission of light P3 (P32) is produced when the electron $e^-$ at the metastable level E1 is caused to make a transition to one of the highest ones of the plurality of energy levels of the ground state E0 by the seed light P2 (P22), of which the wavelength corresponds to the difference in energy between the metastable level E1 and the one of the highest ones of the plurality of energy levels of the ground state E0, for example. In addition, a stimulated emission of light P3 (P31) is also produced when the electron e⁻ at the metastable level E1 is caused to make a transition to another energy level, lower than the metastable level E1, by the seed light P2 (P21), of which the wavelength corresponds to the difference in energy between the metastable level E1 and the former energy level lower than the metastable level E1.

Figure 10:
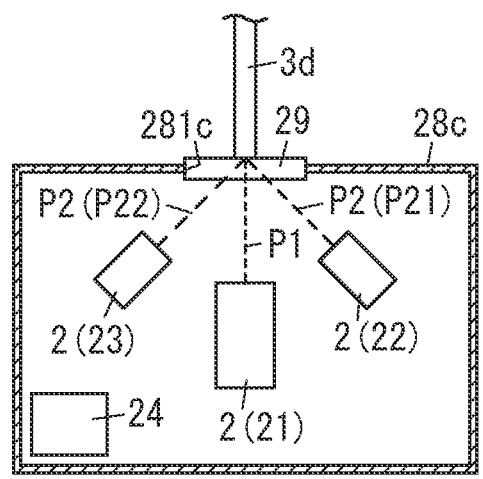
FIG. 10 illustrates a configuration for a light source unit included in the lighting system.

As shown in FIG. 10, the light source unit 1d includes the optical fiber 3d and three laser light sources 2. The three laser light sources 2 include a first laser light source 21 and two second laser light sources 22, 23.

The first laser light source 21 emits the excitation light P1. The excitation light P1 emitted from the first laser light source 21 is incident on the optical fiber 3d. The two second laser light source 22, 23 each emit seed light P2 (hereinafter also referred to as "external seed light P2") to produce a stimulated emission of light P3 from the wavelength-converting element that has been excited by the excitation light P1. The seed light P2 (P21) emitted from the second laser light source 22 and the seed light P2 (P22) emitted from the second laser light source 23 are incident on the optical fiber 3d.

Figure 11:
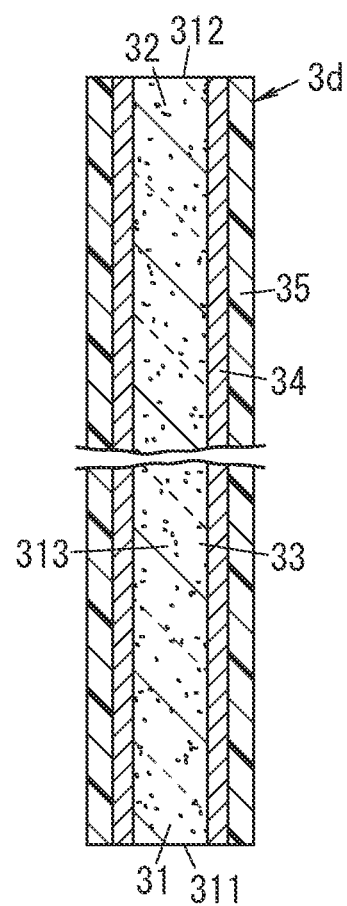
FIG. 11 is a cross-sectional view of an optical fiber included in the lighting system.

The optical fiber 3d includes a core 33, a cladding 34, and a coating 35 as shown in FIG. 11. The cladding 34 covers the outer peripheral surface of the core 33. The coating 35 covers the outer peripheral surface of the cladding 34. A cross section, taken along a plane perpendicular to the optical axis, of the core 33 has a circular shape. The cladding 34 is disposed coaxially with the core 33.

The core 33 has a first end face and a second end face, which is located at the opposite longitudinal end of the core 33 from the first end face. The core 33 includes a light-transmitting material and a wavelength-converting element. The concentration of the wavelength-converting element in the core 33 may or may not be substantially uniform along the entire length of the core 33. The refractive index of the core 33 may be substantially equal to the refractive index of the light-transmitting material that is a main component of the core 33. The optical fiber 3d has a first end 31 of the longitudinal axis thereof (refer to FIGS. 10 and 11) and a second end 32 (refer to FIGS. 11 and 13) opposite from the first end 31. The first end 31 of the optical fiber 3d includes an incident end face (i.e., the first end face of the core 33) on which the light coming from the laser light source 2 is incident. The second end 32 of the optical fiber 3d includes an emergent end face (i.e., the second end face of the core 33) through which the light that has been incident through the incident end face and that has propagated through the optical fiber 3d emerges.

The light-transmitting material may be, for example, a fluoride, an oxide, or a nitride. The fluoride may be glass fluoride, for example. The oxide may be a silicon oxide or quartz, for example.

The wavelength-converting element is a rare earth element. In this embodiment, the wavelength-converting element includes an element selected from the group consisting of, for example, Pr, Tb, Ho, Dy, Er, Eu, Nd, and Mn. The wavelength-converting element is contained as an ion of a rare earth element in the core 33, e.g., contained as an ion of Pr ($Pr^{3+}$) or an ion of Tb ($Tb^{3+}$) in the core 33. In this case, the wavelength-converting element may be excited by either the excitation light P1 or an amplified spontaneous emission (ASE) of light. The amplified spontaneous emission (ASE) of light is produced by amplifying the spontaneous emission of light, emitted from a different wavelength-converting element other than the wavelength-converting elements itself, as internal seed light. Through such excitation, the wavelength-converting element emits not only an ASE unique to the element of the wavelength-converting element but also a stimulated emission of light having the same wavelength as the seed light P2, thus emitting them as the stimulated emission of light P3. The wavelengths of the ASE and the seed light P2 are longer than the wavelength of the excitation light P1 (which may be equal to or longer than 440 nm and equal to or shorter than 450 nm, for example).

$Pr^{3+}$ is a wavelength-converting element that may emit either an ASE or amplified seed light in the cyan to red range. The intensity of the stimulated emission of light depends on the respective intensities of the internal seed light (the spontaneous emission of light) and the external seed light. If the core 33 contains $Pr^{3+}$ and $Tb^{3+}$, then $Tb^{3+}$ is excited by absorbing an ASE from $Pr^{3+}$ and may produce an ASE having a wavelength unique to $Tb^{3+}$.

The refractive index of the cladding 34 is less than the refractive index of the core 33. The cladding 34 does not contain the wavelength-converting element contained in the core 33.

The material of the coating 35 may be a resin, for example.

The optical fiber 3d includes a light incident portion 311, a light emerging portion 312, and a wavelength-converting portion 313.

The light incident portion 311 is a portion on which the excitation light P1 is incident and may include the first end face of the core 33, for example. The light emerging portion 312 includes the second end face of the core 33, through which light including the excitation light P1 and the stimulated emission of light P3 such as an ASE emerges.

The light incident portion 311 may include a reflection reducing portion for reducing the reflection of the excitation light P1 incident on the light incident portion 311 from outside of the optical fiber 3d. The reflection reducing portion may be, for example, an anti-reflection coating that covers the first end face of the core 33.

The wavelength-converting portion 313 is provided between the light incident portion 311 and the light emerging portion 312. The wavelength-converting portion 313 contains a wavelength-converting element which is excited by the excitation light P1 to emit light having a longer wavelength than the excitation light P1. The wavelength-converting element is an element that may absorb the excitation light P1 and amplify, by stimulated emission, either the spontaneous emission of light or seed light, each having a longer wavelength than the excitation light P1.

The core 33 may have a diameter falling within the range from 5 μm to 500 μm, for example. The optical fiber 3d may have a length falling within the range from 3 m to 10 m, for example. As for the length of the wavelength-converting portion 313, the lower the concentration of the wavelength-converting element in the wavelength-converting portion 313 is, the greater the length of the wavelength-converting portion 313 preferably is. The optical fiber 3d may have a numerical aperture of 0.22, for example. The concentration of the wavelength-converting element in the wavelength-converting portion 313 is the concentration of the wavelength-converting element in the core 33.

The first laser light source 21 emits the excitation light P1 to excite the wavelength-converting element contained in the wavelength-converting portion 313 of the optical fiber 3d. The excitation light P1 emitted from the first laser light source 21 is incident on the light incident portion 311 of the optical fiber 3d. To excite the wavelength-converting element more efficiently, the excitation light P1 preferably has a wavelength equal to or longer than 350 nm and equal to or shorter than 500 nm.

The first laser light source 21 emits a laser beam as the excitation light P1. The excitation light P1 (laser beam) emitted from the first laser light source 21 is incident on the light incident portion 311 of the optical fiber 3d. The first laser light source 21 may be, for example, a semiconductor laser diode that emits a blue laser beam. In that case, the excitation light P1 may have a wavelength equal to or longer than 440 nm and equal to or shorter than 450 nm, for example.

The second laser light source 22 emits the seed light P2 (P21). The seed light P2 emitted from the second laser light source 22 is incident on the light incident portion 311 of the optical fiber 3d. The second laser light source 23 emits the seed light P2 (P22). The seed light P2 emitted from the second laser light source 23 is incident on the light incident portion 311 of the optical fiber 3d.

The two second laser light sources 22, 23 each emits, for example, seed light P2 having a single wavelength. The seed light P2 emitted from one of these two second laser light sources 22, 23 has a different wavelength from the seed light P2 emitted from the other of these two second laser light sources 22, 23. The second laser light source 22 may be a semiconductor laser diode that emits a green light ray, for example. The second laser light source 23 may be a semiconductor laser diode that emits a red light ray, for example. If the wavelength-converting element of the wavelength-converting portion 313 includes $Pr^{3+}$, then the wavelength of the green seed light ray P21 is preferably about 520 nm, for example, and the wavelength of the red seed light ray P22 is preferably about 640 nm, for example. These two second laser light sources 22, 23 are light sources, each of which emits quasi-monochromatic light. As used herein, the "quasi-monochromatic light" refers to light falling within a narrow wavelength range (with a width of 10 nm, for example). Although the light source unit 1d includes two second laser light sources 22, 23 as laser light sources that emit the seed light P2, the number of the second laser light sources that emit the seed light P2 does not have to be two but may also be three or more or even one. If the light source unit 1d includes three second laser light sources that emit the seed light P2, then the three second laser light sources that emit the seed light P2 include the second laser light source 22 as a semiconductor laser diode that emits a green light ray, the second laser light source 23 as a semiconductor laser diode that emits a red light ray, and a second laser light source as a semiconductor laser diode that emits an orange light ray. The orange seed light ray preferably has a wavelength of about 600 nm, for example.

The light emitted from the second laser light source 22 is incident as a seed light ray P2 (P21) on the light incident portion 311 of the optical fiber 3d. The light emitted from the second laser light source 23 is incident as a seed light ray P2 (P22) on the light incident portion 311 of the optical fiber 3d.

The light source unit 1d 1 includes a housing 28d that houses the first laser light source 21 and the two second laser light sources 22, 23 therein.

The light source unit 1d further includes an adjustment unit 24. The adjustment unit 24 adjusts the intensity of the seed light P2 having at least one wavelength. In this embodiment, the light source unit 1d adjusts the intensity of the excitation light P1 and the respective intensities of the plurality of seed light rays P21, P22. The adjustment unit 24 includes: a first driver circuit for driving the first laser light source 21; a second driver circuit for driving the second laser light source 22; a third driver circuit for driving the second laser light source 23; and a control circuit. The control circuit controls the first driver circuit, the second driver circuit, and the third driver circuit on an individual basis. In the adjustment unit 24, the control circuit controls the first driver circuit, the second driver circuit, and the third driver circuit on an individual basis, thus making the chromaticity of the light emerging from (the light emerging portion 312 of) the optical fiber 3d adjustable. In short, providing the adjustment unit 24 for the light source unit 1d makes the color of the emerging light controllable. Therefore, the light source unit 1d may control the color of the light emerging from the projection member 4d. In this embodiment, the adjustment unit 24 is housed in the housing 28d. However, this is only an example and the adjustment unit 24 does not have to be housed in the housing 28d. The first driver circuit, the second driver circuit, and the third driver circuit are supplied with supply voltage from a first power supply circuit, for example Meanwhile, the control circuit is supplied with supply voltage from a second power supply circuit, for example. In this embodiment, the first power supply circuit and the second power supply circuit are not counted among the constituent elements of the light source unit 1d. However, this is only an example and should not be construed as limiting. Alternatively, the first power supply circuit and the second power supply circuit may be counted among constituent elements of the light source unit 1d.

The light source unit 1d may further include a photocoupler 29 to make the excitation light P1 and the respective seed light rays P2 incident on the light incident portion 311 of the optical fiber 3. The photocoupler 29 is disposed at an aperture 281d of the housing 28d. The photocoupler 16 may be, but does not have to be, a grating. The grating is a transmissive diffraction grating. A material for the grating may be, but does not have to be, quartz, for example.

The light source unit 1d makes the first laser light source 21 emit the excitation light P1 and also makes the second laser light sources 22, 23 emit the seed light rays P2. Thus, the light source unit 1d allows the excitation light P1 and the respective seed light rays P2 to be incident on the light incident portion 311 of the optical fiber 3d. Part of the excitation light P1 incident on the light incident portion 311 emerges from the light emerging portion 312. In the light source unit 1d, the light emerging from the light emerging portion 312 of the optical fiber 3d is mixed light in which the excitation light P1, an ASE having a wavelength of about 480 nm and produced from the wavelength-converting element, and the stimulated emission of light P3 having the same wavelength as the seed light P2 are mixed together. Two types of stimulated emissions of light P31, P32 corresponding one to one to the multiple seed light rays P21, P22 and having mutually different wavelengths may be, for example, a green ray and a red ray, respectively. In that case, the mixed light may be white light Lw, for example. In FIG. 12C, the upper stimulated emission of light P32 is the red ray and the lower stimulated emission of light P31 is the green ray.

In the optical fiber 3d, stimulated emission is produced by the spontaneous emission of light and the seed light P2, and therefore, the excitation light P1 incident on the light incident portion 311 and the stimulated emission of light P3 amplified by stimulated emission emerge from the light emerging portion 312. The stimulated emission of light P3 having the same wavelength as the seed light ray P21 of the light emerging from the light emerging portion 312 of the optical fiber 3d has a higher intensity than the seed light ray P21 incident from the second laser light source 22 onto the light incident portion 311. Also, the stimulated emission of light P3 having the same wavelength as the seed light ray P22 of the light emerging from the light emerging portion 312 of the optical fiber 3d has a higher intensity than the seed light ray P22 incident from the second laser light source 23 onto the light incident portion 311. The white light Lw emerging from the light emerging portion 312 of the optical fiber 3d is coherent light. In the light source unit 1d, the chromaticity, color temperature, color rendering index, and other parameters of the light emerging from the optical fiber 3d are determined by the respective wavelengths of the ASE and the seed light P2.

In the light source unit 1d, the wavelength-converting element that serves as a heat source is distributed in the core 33 of the optical fiber 3d, and therefore, an increase in temperature may be reduced while the light source unit 1d is being used.

Also, in the light source unit 1d, the adjustment unit 24 adjusts the intensity of the excitation light P1 and the respective intensities of the multiple seed light rays P2. However, this is only an example and should not be construed as limiting. Alternatively, the adjustment unit 24 may also be configured to adjust the intensity of the seed light P2 having at least one wavelength.

Figure 13:
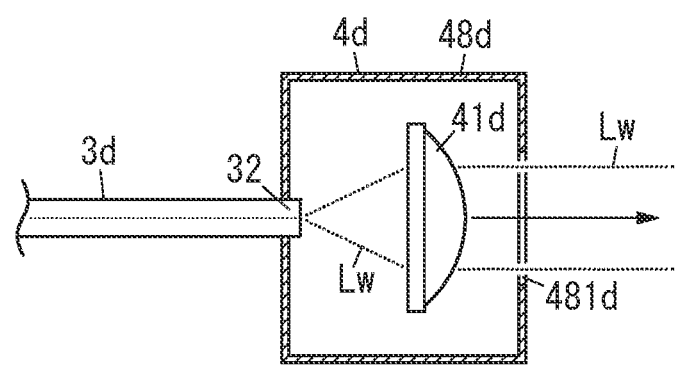
FIG. 13 illustrates a configuration for a light source unit included in the lighting system.

Also, in the light source unit 1d, the projection member 4d includes a collimator lens 41d for collimating the white light Lw emerging from the optical fiber 3 and a housing 48d that houses the collimator lens 41d as shown in FIG. 13. Thus, the light source unit 1d projects the white light Lw as a beam of light. In the housing 48d, at least a part 481d thereof, through which the white light Lw emerging from the collimator lens 41d is transmitted, is made of a light-transmitting material. In the housing 48d, at least that part 481d, through which the white light Lw emerging from the collimator lens 41d is transmitted, may be an aperture.

As shown in FIG. 10, the light source unit 1d includes the optical fiber 3d, the first laser light source 21, and the second laser light sources 22, 23. The optical fiber 3d includes the wavelength-converting portion 313 containing a wavelength-converting element. The wavelength-converting element may be excited by the excitation light P1 to produce a spontaneous emission of light having a longer wavelength than the excitation light P1 and may also be excited by an amplified spontaneous emission of light. The first laser light source 21 emits the excitation light P1 to be incident on the optical fiber 3d. The second laser light sources 22, 23 each emit seed light P2 to be incident on the optical fiber 3d to produce the stimulated emission of light P3 from the wavelength-converting element that has been excited by either the excitation light P1 or the amplified spontaneous emission of light.

Figure 9:
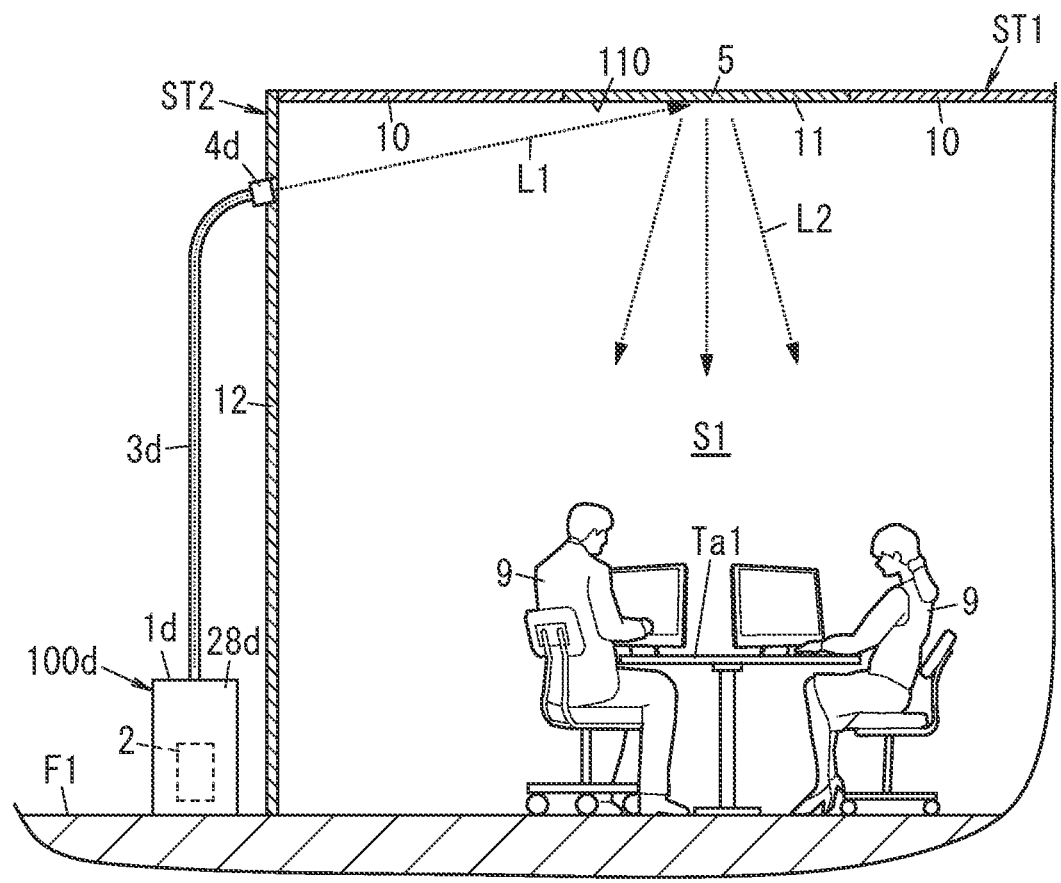
FIG. 9 illustrates a configuration for a lighting system according to a third embodiment.

The lighting system 100d according to the third embodiment includes the light source unit 1d and the light-distributing member 5 as shown in FIG. 9, and therefore, may provide, as well as the lighting system 100 according to the first embodiment, lighting light L2 for the target space S1 without installing any lighting fixture on the ceiling facing the target space S1. In addition, the lighting system 100d according to the third embodiment uses, as the incident light L1, light having a high degree of directivity and a high degree of coherence (i.e., a beam of light suitable for propagation through a space over a long distance). Furthermore, in the lighting system 100d, the lighting light L2 to be transformed and distributed by the light-distributing member 5 has a lower degree of directivity and a lower degree of coherence than the incident light L1 and suitable for lighting. Furthermore, the lighting system 100d uses the laser light sources 2 as the light source. This enables increasing the directivity of the incident light L1, thus allowing the light source to be disposed more distant from the ceiling.

In addition, in the lighting system 100d, the light source unit 1d further includes the adjustment unit 24 for adjusting the respective intensities of a plurality of seed light rays P2 having multiple wavelengths, thus making the chromaticity of the white light Lw emerging from the light source unit 1d adjustable.

Furthermore, in the lighting system 100d, the wavelength-converting portion 313 contains $Pr^{3+}$ as the wavelength-converting element and not only emits an ASE in cyan but also makes seed light rays P2 with multiple different wavelengths incident on the light incident portion 311, thus increasing the respective intensities of a stimulated emission of light in green and a stimulated emission of light in red. Consequently, the lighting system 100d improves the color rendering performance of the lighting light L2. In addition, in the lighting system 100d, the wavelength-converting portion 313 contains $Pr^{3+}$ and $Tb^{3+}$ as two types of wavelength-converting elements, thus further improving the color rendering performance of the lighting light L2.

Variation of Third Embodiment

Figure 14:
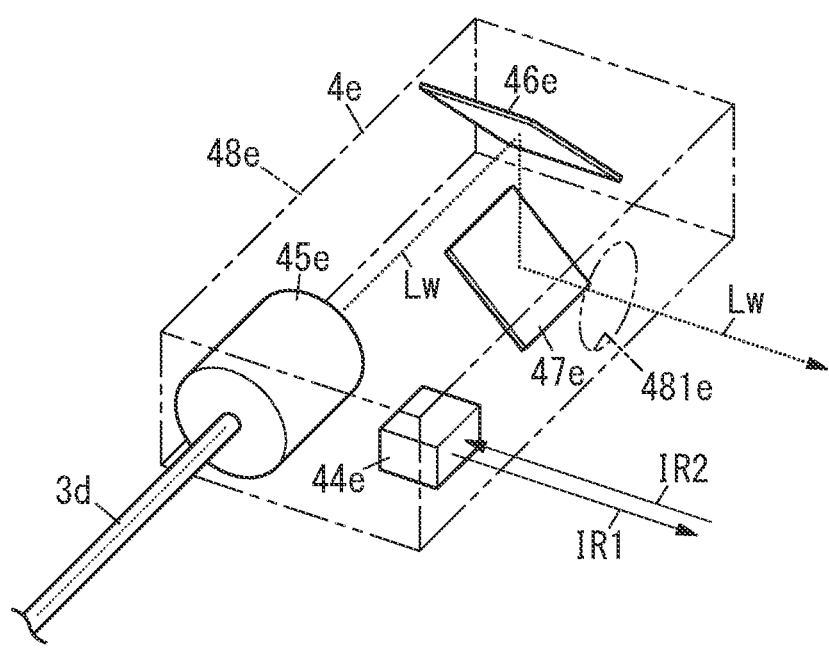
FIG. 14 illustrates a configuration for a projection member included in a lighting system according to a first variation of the third embodiment.

A lighting system 100d according to a variation of the third embodiment includes a projection member 4e (refer to FIG. 14) instead of the projection member 4d of the light source unit 1d. The lighting system 100d according to this variation of the third embodiment has the same basic configuration as the lighting system 100d (refer to FIG. 9) according to the third embodiment, and description and illustration thereof will be omitted herein.

The projection member 4e includes: a collimating unit 45e for collimating the white light Lw coming from the optical fiber 3d; and two scanning mirrors 46e, 47e that allow the projection direction of the white light Lw emerging from the collimating unit 45e to be scanned. The projection member 4e further includes a housing 48e that houses the collimating unit 45e and the two scanning mirrors 46e, 47e. In the housing 48e, a part 481e thereof, through which the white light Lw is projected toward the target space S1, is made of a light-transmitting material. In the housing 48e, that part 481e may be an aperture. The scanning mirrors 46e, 47e are controlled by a control circuit, for example. The control circuit controls the scanning mirrors 46e, 47e such that the white light Lw projected from the projection member 4e is directed toward the first building component 11 (refer to FIG. 9). Each of the scanning mirrors 46, 47 may be a microelectromechanical systems (MEMS) mirror but may also be a polygon mirror, for example.

The projection member 4e further includes a sensing unit 44e. The sensing unit 44e is a human detection sensor that emits an infrared beam IR1, which is substantially parallel to the white light Lw emerging as a beam of light from the projection member 4e, and detects, by determining whether the sensing unit 44e has received any reflected beam IR2 of the infrared beam IR1, the presence or absence of any human being in the direction aligned with the projection direction of the white light Lw.

The lighting system 100b according to this variation of the third embodiment includes the projection member 4e instead of the projection member 4d. As soon as the sensing unit 44e detects the presence of any human being, the lighting system 100d immediately instructs the three laser light sources 2 (refer to FIG. 10) to stop operating. More specifically, the control circuit instructs, depending on the result of detection by the sensing unit 44e, the driver circuit for driving the three laser light sources 2 to stop operating, thereby causing the three laser light sources 2 to stop emitting the laser beam.

Figure 15:
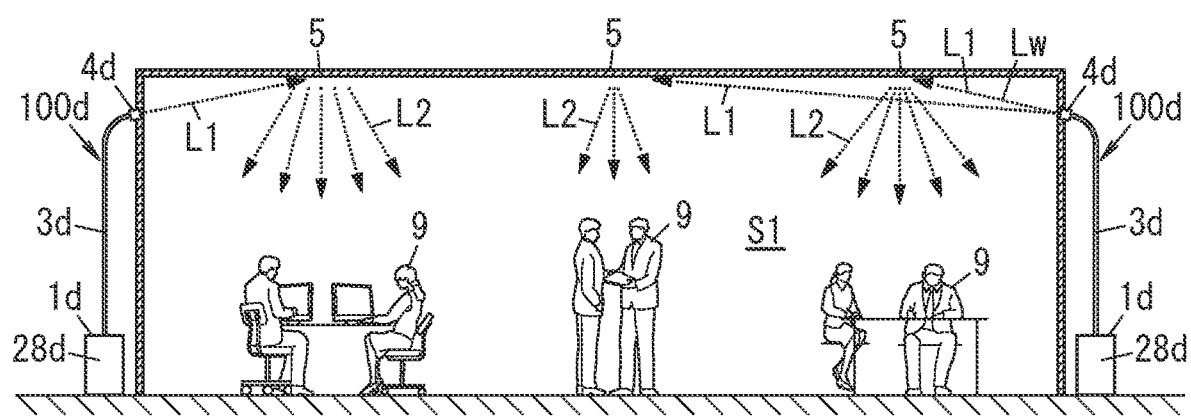
FIG. 15 illustrates a configuration for a lighting system according to a second variation of the third embodiment.

The lighting system 100d according to this variation of the third embodiment may include a plurality of light-distributing members 5 as shown in FIG. 15. The lighting system 100d may scan the projection direction of the white light Lw emerging from the projection member 4e. Thus, the lighting system 100d may change the light-distributing members 5, on which the white light Lw emerging from the projection member 4 is incident as the incident light L1, out of the plurality of light-distributing members 5 as shown in FIG. 15.

Fourth Embodiment

Figure 16:
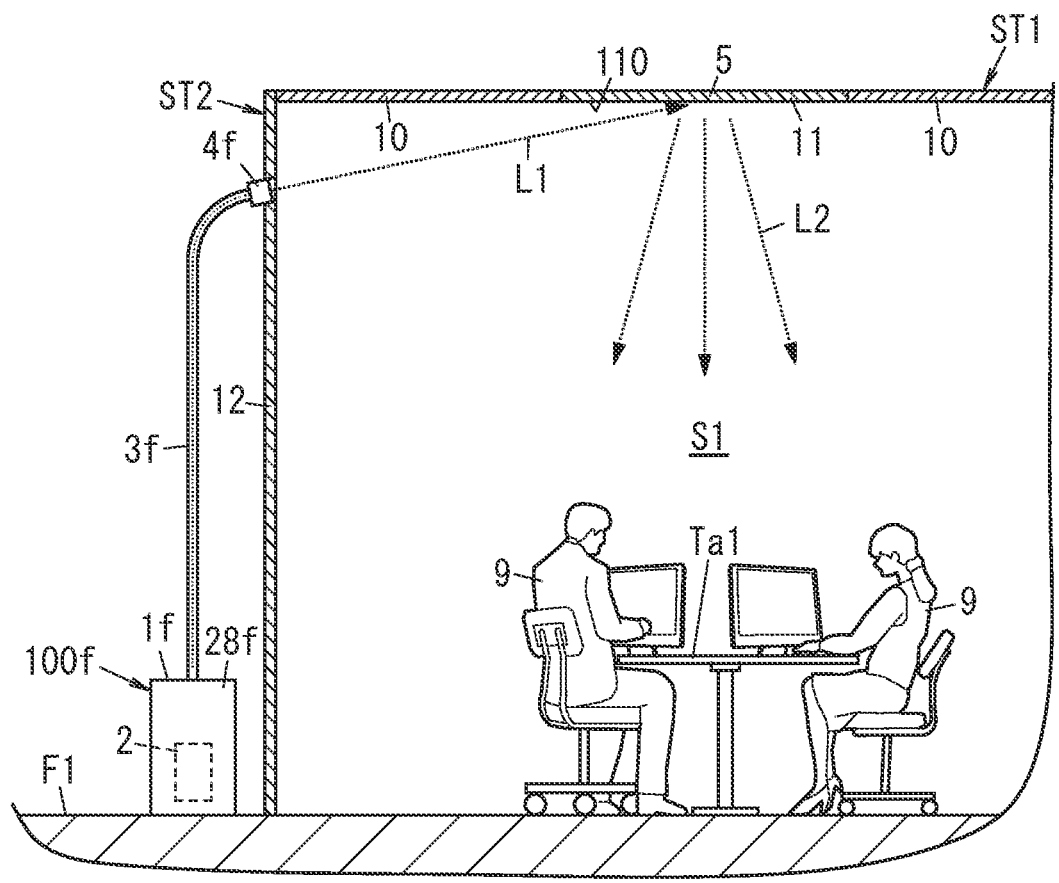
FIG. 16 illustrates a configuration for a lighting system according to a fourth embodiment.

A lighting system 100f according to a fourth embodiment will be described with reference to FIGS. 16 and 17. In the following description, any constituent element of the lighting system 100f according to this fourth embodiment, having the same function as a counterpart of the lighting system 100 according to the first embodiment described above, will be designated by the same reference numeral as that counterpart's, and description thereof will be omitted herein.

The lighting system 100f according to the fourth embodiment includes a light source unit 1f instead of the light source unit 1 of the lighting system 100 according to the first embodiment, which is a difference from the lighting system 100 according to the first embodiment.

Figure 17:
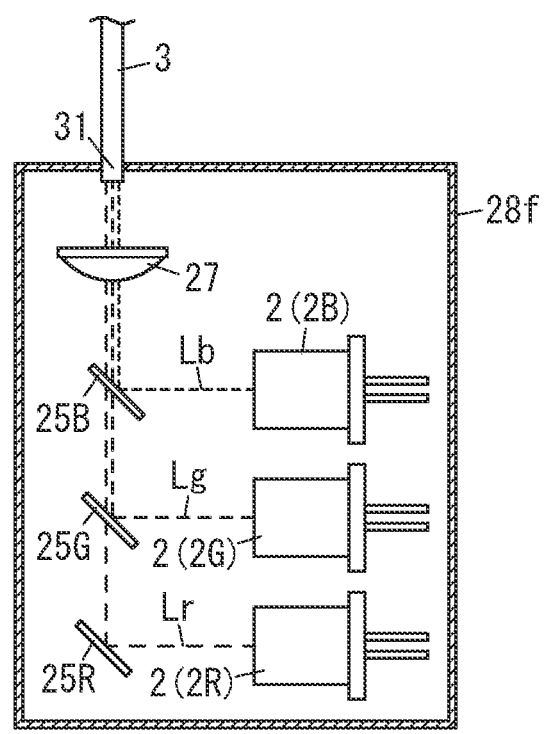
FIG. 17 illustrates a configuration for a light source unit included in the lighting system.

As shown in FIG. 17, the light source unit 1f includes a plurality of (e.g., three) laser light sources 2. The three laser light sources 2 are a red semiconductor laser diode 2R for emitting red light Lr, a green semiconductor laser diode 2G for emitting green light Lg, and a blue semiconductor laser diode 2B for emitting blue light Lb. In the light source unit 1f, the red light Lr, the green light Lg, and the blue light Lb are incident on the optical fiber 3.

The light emerging from the optical fiber 3 after having been incident on, and propagated through, the optical fiber 3 is white light Lw as a mixture of the red light Lr, the green light Lg, and the blue light Lb.

The light source unit 1f further includes: three mirrors 25R, 25G, 25B, provided one to one for the three laser light sources 2, 2, 2; a condenser lens 27; and a housing 28f. The housing 28f houses the three laser light sources 2, 2, 2, the three mirrors 25R, 25G, 25B, and the condenser lens 27. The mirror 25R reflects the red light Lr coming from the red semiconductor laser diode 2R toward the condenser lens 27. The mirror 25G reflects the green light Lg coming from the green semiconductor laser diode 2G toward the condenser lens 27. The mirror 25B reflects the blue light Lb coming from the blue semiconductor laser diode 2B toward the condenser lens 27.

The mirror 25R, the mirror 25G, the mirror 25B, the condenser lens 27, and the first end 31 of the optical fiber 3 are arranged in line in this order from the mirror 25R toward the first end 31 of the optical fiber 3. The mirror 25G is a dichroic mirror which reflects the green light Lg coming from the green semiconductor laser diode 2G toward the first end 31 of the optical fiber 3 and transmits the red light Lr that has been reflected from the mirror 25R. The mirror 25B is a dichroic mirror which reflects the blue light Lb coming from the blue semiconductor laser diode 2B toward the first end 31 of the optical fiber 3 and transmits the red light Lr that has been reflected from the mirror 25R and the green light Lg that has been reflected from the mirror 25G.

In the light source unit 1f, the three laser light sources 2 and the optical fiber 3 are optically coupled to each other via the three mirrors 25R, 25G, 25B and the condenser lens 27.

The projection member 4f includes a collimator lens for collimating the white light Lw emerging from the optical fiber 3 and projects, toward the target space S1, the white light Lw that has been collimated by the collimator lens. The white light Lw projected from the projection member 4f is incident as incident light L1 on the light-distributing member 5.

The lighting system 100f according to the fourth embodiment includes the light source unit 1f and the light-distributing member 5, and therefore, may provide, as well as the lighting system 100 according to the first embodiment, lighting light L2 for the target space S1 without installing any lighting fixture on the ceiling facing the target space S1. In addition, the lighting system 100f according to the fourth embodiment uses, as the incident light L1, light having a high degree of directivity and a high degree of coherence (i.e., a beam of light suitable for propagation through a space over a long distance). Furthermore, in the lighting system 100f, the lighting light L2 to be transformed and distributed by the light-distributing member 5 has a lower degree of directivity and a lower degree of coherence than the incident light L1 and suitable for lighting. Furthermore, the lighting system 100f uses the laser light sources 2 as the light source. This enables increasing the directivity of the incident light L1, thus allowing the light source to be disposed more distant from the ceiling.

Fifth Embodiment

Figure 18:
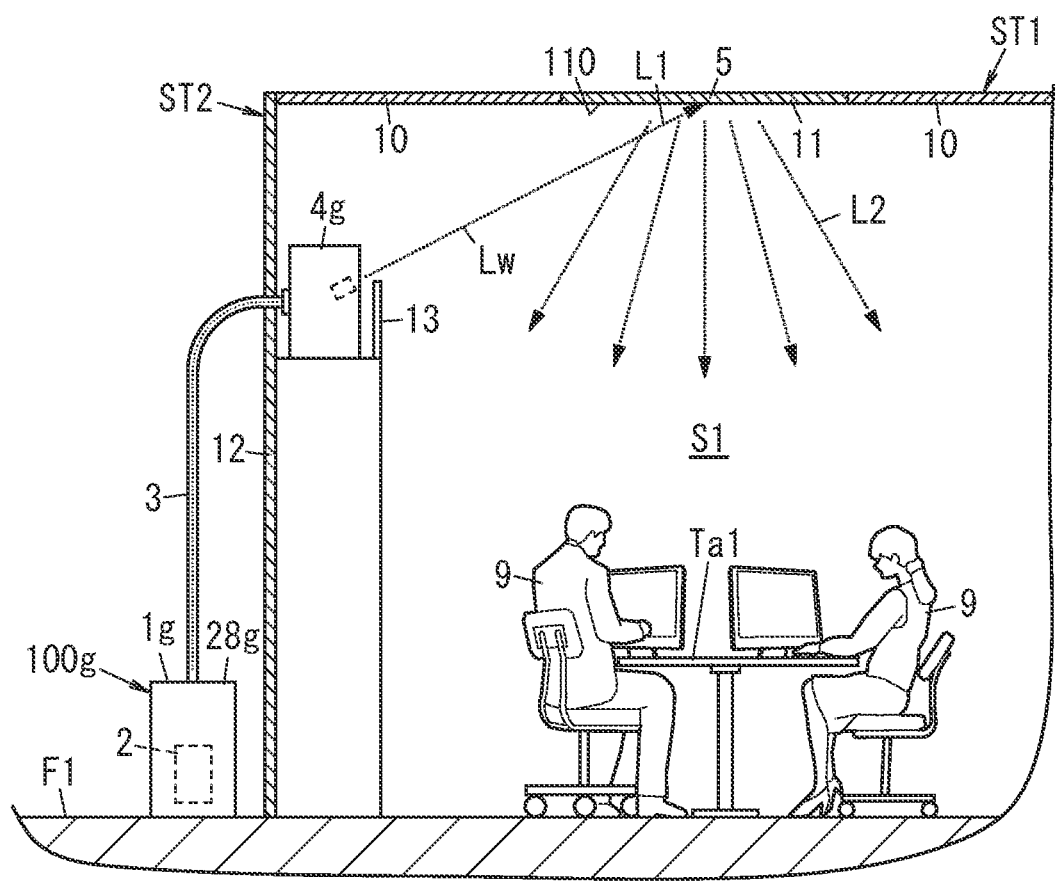
FIG. 18 illustrates a configuration for a lighting system according to a fifth embodiment.

A lighting system 100g according to a fifth embodiment will be described with reference to FIG. 18. In the following description, any constituent element of the lighting system 100g according to this fifth embodiment, having the same function as a counterpart of the lighting system 100 according to the first embodiment described above, will be designated by the same reference numeral as that counterpart's, and description thereof will be omitted herein.

The lighting system 100g according to the fifth embodiment includes a light source unit 1g instead of the light source unit 1 of the lighting system 100 according to the first embodiment, which is a difference from the lighting system 100 according to the first embodiment.

In the light source unit 1g, the housing 28g that houses the laser light sources 2 is installed on the floor surface F1 at the rear of the second building component 12, while a part of the optical fiber 3 and the projection member 4g are arranged in the target space S1, not at the rear of the second building component 12.

The lighting system 100g includes a shading member 13 that shades the projection member 4g from view of persons 9 present in the target space S1.

The lighting system 100g according to the fifth embodiment includes the light source unit 1g and the light-distributing member 5, and therefore, may provide, as well as the lighting system 100 according to the first embodiment, lighting light L2 for the target space S1 without installing any lighting fixture on the ceiling facing the target space S1.

In addition, in the lighting system 100g, the projection member 4g and the shading member 13 are arranged at a height equal to or greater than a predetermined height (of 2 meters centimeters, for example) as measured from the floor surface F1. The predetermined height is determined such that the projection member 4g and the shading member 13 are located higher than the head top of a person 9 as measured from the floor surface F1. In addition, the projection member 4g is arranged to let the incident light L1 travel upward with respect to the horizontal direction (i.e., diagonally upward), not downward with respect to the horizontal direction. This makes the projection member 4g less conspicuous in the lighting system 100g and prevents the person 9 from peeking into the projection member 4g.

Other Variations

Note that the first to fifth embodiments and their variations described above are only exemplary ones of various embodiments and variations of the present disclosure and should not be construed as limiting. Rather, the first to fifth embodiments and their variations may be readily modified in various manners depending on a design choice or any other factor without departing from the scope of the present disclosure.

For example, the first building component 11 does not have to be a ceiling member but may also a beam, for example.

Also, in the lighting system 100, the laser light source 2 does not have to be a semiconductor laser diode that emits a blue laser beam but may also be, for example, a semiconductor laser diode that emits a violet laser beam. In that case, the wavelength converter 40 preferably includes blue phosphor particles, yellow phosphor particles, green phosphor particles, and red phosphor particles.

Furthermore, the optical fiber 3 is not an essential constituent element for the lighting systems 100, 100f.

Aspects

The first to fifth embodiments and their variations described above are specific implementations of the following aspects of the present disclosure.

A lighting system (100; 100b; 100d; 100f; 100g) according to a first aspect includes a light source unit (1; 1b; 1d; 1f; 1g) and a light-distributing member (5; 5b). The light source unit (1; 1b; 1d; 1f; 1g) includes a laser light source (2). The light-distributing member (5; 5b) has a function of reflecting incident light (L1) that has been emitted as a beam of light from the light source unit (1; 1b; 1d; 1f; 1g) toward a target space (S1). The light-distributing member (5; 5b) transforms the incident light (L1) into lighting light (L2) having a different light distribution property from the incident light (L1) and distributes the lighting light (L2) over the target space (S1).

The lighting system (100; 100b; 100d; 100f; 100g) according to the first aspect may provide lighting light (L2) without using any lighting fixture.

In a lighting system (100; 100b; 100d; 100f; 100g) according to a second aspect, which may be implemented in conjunction with the first aspect, the light source unit (1; 1b; 1d; 1f; 1g) includes an optical fiber (3; 3d) that receives light coming from the laser light source (2).

The lighting system (100; 100b; 100d; 100f; 100g) according to the second aspect allows the laser light source (2) to be arranged with an increased degree of freedom.

In a lighting system (100b) according to a third aspect, which may be implemented in conjunction with the second aspect, the light-distributing member (5b) has a function of transforming the incident light (L1) into the lighting light (L2) including light with a different wavelength from the incident light (L1).

The lighting system (100b) according to the third aspect may extend the transmission distance of a laser beam (blue light Lb) as the incident light (L1).

In a lighting system (100d) according to a fourth aspect, which may be implemented in conjunction with the second aspect, the optical fiber (3d) includes a core (33) containing, as a wavelength-converting element, one or more elements selected from the group consisting of Pr, Tb, Ho, Dy, Er, Eu, Nd, and Mn. The light source unit (1d) includes a plurality of the laser light sources (2). The plurality of the laser light sources (2) includes a first laser light source (21) and a second laser light source (22). The first laser light source (21) emits excitation light (P1) to be incident on the optical fiber (3d). The excitation light (P1) may excite the wavelength-converting element. The second laser light source (22) emits seed light (P2) to be incident on the optical fiber (3). A wavelength of the seed light (P2) is longer than a wavelength of the excitation light (P1). The incident light (L1) includes a light ray, a wavelength component of which is as long as the wavelength of the seed light (P2). An intensity of the light ray having the wavelength component is greater than an intensity of the seed light (P2).

The lighting system (100d) according to the fourth aspect may extend the transmission distance of a beam of light (white light Lw) as the incident light (L1).

In a lighting system (100f) according to a fifth aspect, which may be implemented in conjunction with the first or second aspect, the light source unit (1f) includes a plurality of the laser light sources (2). The plurality of the laser light sources (2) includes: a red semiconductor laser diode (2R) that emits red light (Lr); a green semiconductor laser diode (2G) that emits green light (Lg); and a blue semiconductor laser diode (2B) that emits blue light (Lb).

The lighting system (100f) according to the fifth aspect may extend the transmission distance of a beam of light (white light Lw) as the incident light (L1).

In a lighting system (100; 100d; 100f; 100g) according to a sixth aspect, which may be implemented in conjunction with any one of the first to fifth aspects, the light-distributing member (5) is a building component (11) that forms at least part of a structure (ST1) facing the target space (S1). The light source unit (1; 1d; 1f; 1g) is disposed distant from the building component (11). The incident light (L1) passes through the target space (S1) to be incident on the building component (11).

The lighting system (100; 100d; 100f; 100g) according to the sixth aspect allows the building component (11) to be used as the light-distributing member (5).

In a lighting system (100; 100d; 100f; 100g) according to a seventh aspect, which may be implemented in conjunction with the sixth aspect, the building component (11) is a ceiling member.

The lighting system (100; 100d; 100f; 100g) according to the seventh aspect achieves the advantage of making it easier to light up the target space (S1) with the lighting light (L2), thus providing natural lighting that would not make persons feel uncomfortable.

In a lighting system (100; 100b; 100d; 100f; 100g) according to an eighth aspect, which may be implemented in conjunction with any one of the first to seventh aspects, the light source unit (1g) further includes a shading member (second building component 12; 13) arranged to shade a projection member (4; 4a; 4b; 4c; 4d; 4e; 4f; 4g). The projection member (4; 4a; 4b; 4c; 4d; 4e; 4f; 4g) projects the beam of light (white light Lw).

The lighting system (100; 100b; 100d; 100f; 100g) according to the eighth aspect may shade the projection member (4; 4a; 4b; 4c; 4d; 4e; 4f; 4g) from view of persons (9) present in the target space (S1).

In a lighting system (100; 100d; 1000) according to a ninth aspect, which may be implemented in conjunction with any one of the first to seventh aspects, the light-distributing member (5) is a first building component (11) that forms part of a first structure (ST1) facing the target space (S1). The light source unit (1; 1d; 10) includes a projection member (4; 4a; 4b; 4c; 4d; 4e; 4f; 4g) that projects, toward the light-distributing member (5), the beam of light to be the incident light (L1). The projection member (4; 4a; 4b; 4c; 4d; 4e; 4f; 4g) is provided for a second building component (12). The second building component (12) is separate from the first building component (11) and forms part of a second structure (ST2) distinct from the first structure (ST1).

The lighting system (100; 100d; 100f) according to the ninth aspect may have improved installability.

A lighting system (100; 100b; 100d; 100f; 100g) according to a tenth aspect, which may be implemented in conjunction with any one of the first to ninth aspects, includes a plurality of the light source units (1; 1b; 1d; 1f; 1g).

The lighting system (100; 100b; 100d; 100f; 100g) according to the tenth aspect may provide a plurality of areas of the target space (S1) with multiple different types of lighting light (L2).

A lighting system (100; 100b; 100d; 100f; 100g) according to an eleventh aspect, which may be implemented in conjunction with any one of the first to tenth aspects, includes a plurality of the light-distributing members (5; 5b).

The lighting system (100; 100b; 100d; 100f; 100g) according to the eleventh aspect may provide a plurality of areas of the target space (S1) with multiple different types of lighting light (L2).

REFERENCE SIGNS LIST

1 Light Source Unit
2 Laser Light Source
21 First Laser Light Source
22 Second Laser Light Source
23 Second Laser Light Source
2B Blue Semiconductor Laser Diode
2G Green Semiconductor Laser Diode
2R Red Semiconductor Laser Diode
3, 3d Optical Fiber
33 Core
4, 4a, 4b, 4c, 4d, 4e, 4f, 4g Projection Member
40 Wavelength Converter
5a Light-Distributing Member
9 Person
11 Building Component (First Building Component)
12 Second Building Component
100, 100b, 100d, 100f, 100g Lighting System
L1 Incident Light
L2 Lighting Light
Lb Blue Light
Lg Green Light
Lr Red Light
Lw White Light
S1 Target Space
ST1 Structure (First Structure)
ST2 Second Structure

The invention claimed is:

1. A lighting system comprising:
a light source unit including a laser light source; and
a light-distributing member having a function of reflecting incident light that has been emitted as a beam of light from the light source unit toward a target space in a facility, the light-distributing member being configured to transform the incident light into lighting light having a different light distribution property from the incident light and distribute the lighting light over the target space,
wherein the light-distributing member is a building component that forms part of a structure facing the target space,
the building component is a ceiling member, the building component has a shape of a panel,
the light source unit is disposed distant from the building component,
the incident light passes through the target space to be incident on a lower surface, facing the target space, of the building component, and
the building component is a decorative plywood board or a decorative board.

2. The lighting system of claim 1, wherein the light source unit includes an optical fiber configured to receive light coming from the laser light source.

3. The lighting system of claim 2, wherein the light-distributing member has a function of transforming the incident light into the lighting light including light with a different wavelength from the incident light.

4. The lighting system of claim 2, wherein
the optical fiber includes a core containing, as a wavelength-converting element, one or more elements selected from the group consisting of Pr, Tb, Ho, Dy, Er, Eu, Nd, and Mn,
the light source unit includes a plurality of the laser light sources,
the plurality of the laser light sources includes:
a first laser light source configured to emit excitation light to be incident on the optical fiber, the excitation light having a function of exciting the wavelength-converting element; and
a second laser light source configured to emit seed light to be incident on the optical fiber, a wavelength of the seed light being longer than a wavelength of the excitation light,
the incident light includes a light ray, a wavelength component of the light ray being as long as the wavelength of the seed light, and
an intensity of the light ray having the wavelength component is greater than an intensity of the seed light.

5. The lighting system of claim 1, wherein
the light source unit includes a plurality of the laser light sources,
the plurality of the laser light sources includes:
a red semiconductor laser diode configured to emit red light;
a green semiconductor laser diode configured to emit green light; and
a blue semiconductor laser diode configured to emit blue light.

6. The lighting system of claim 1, wherein the light source unit further includes a shading member arranged to shade a projection member, the projection member being configured to project the beam of light.

7. A lighting system comprising:
a light source unit including a laser light source; and
a light-distributing member having a function of reflecting incident light that has been emitted as a beam of light from the light source unit toward a target space, the light-distributing member being configured to transform the incident light into lighting light having a different light distribution property from the incident light and distribute the lighting light over the target space, wherein the light-distributing member is a first building component that forms part of a first structure facing the target space, the light source unit includes a projection member configured to project, toward the light-distributing member, the beam of light to be the incident light, and the projection member is provided for a second building component that is separate from the first building component and that forms part of a second structure, the second structure being distinct from the first structure.

8. The lighting system of claim 1, comprising a plurality of the light source units.

9. A lighting system comprising:

a light source unit including a laser light source; and a plurality of light-distributing members each of which having a function of reflecting incident light that has been emitted as a beam of light from the light source unit toward a target space, each of the plurality of light-distributing members being configured to transform the incident light into lighting light having a different light distribution property from the incident light and distribute the lighting light over the target space.

* * * * *